United States Patent [19]

List

[11] 4,281,629
[45] Aug. 4, 1981

[54] COMPRESSION IGNITION DIRECT INJECTION INTERNAL COMBUSTION ENGINE

[76] Inventor: Hans List, 126, Heinrichstrasse, Graz, Austria

[21] Appl. No.: 94,095

[22] Filed: Nov. 14, 1979

[30] Foreign Application Priority Data

Nov. 16, 1978 [AT] Austria ................................ 8194/78

[51] Int. Cl.³ .............................................. F02B 3/00
[52] U.S. Cl. .................................................. 123/279
[58] Field of Search ........................................ 123/279

[56] References Cited

U.S. PATENT DOCUMENTS

| | | | |
|---|---|---|---|
| 1,759,161 | 5/1930 | Lang | 123/279 |
| 1,759,162 | 5/1930 | Lang | 123/279 |
| 1,818,339 | 8/1931 | Lang | 123/279 |
| 2,505,999 | 5/1950 | Smith | 123/279 |
| 2,762,348 | 9/1956 | Meurer | 123/279 |
| 3,963,001 | 6/1976 | Kruckenberg | 123/279 |
| 4,207,843 | 6/1980 | List | 123/263 |

FOREIGN PATENT DOCUMENTS

| | | | |
|---|---|---|---|
| 835979 | 1/1939 | France | 123/279 |
| 844681 | 7/1939 | France | 123/279 |
| 488756 | 4/1952 | Italy | 123/279 |

Primary Examiner—Ronald B. Cox

[57] ABSTRACT

A compression ignition, direct injection internal combustion engine which includes at least each one cylinder, with an associated piston and injection nozzle, the piston having a combustion chamber in its head in the form of a body of rotation. The combustion chamber includes below the crown of the piston a constriction which divides the chamber in an upper part and a lower part. The connecting passage formed by the constriction between the upper part and the lower part of the chamber includes a number of additionally connecting canals in the region of the circumference of the chamber, which are groovelike and open to the chamber.

Based on the specific forms and arrangements of the connecting canals, a marked micro turbulence of the cylinder charge, a better mixture formation and an improved combustion process, with lower amounts of unburnt hydrocarbons and soot in the exhaust, is achieved.

8 Claims, 7 Drawing Figures

COMPRESSION IGNITION DIRECT INJECTION INTERNAL COMBUSTION ENGINE

BACKGROUND OF THE INVENTION

This invention relates to a compression ignition, direct injection internal combustion engine, and particularly to such an engine, having at least one cylinder with an associated piston which has a combustion chamber or cavity in the form of a body of rotation disposed in its head to receive almost the entire quantity of combustion air at the end of the compression stroke, this chamber including a constriction of the piston which divides the chamber into an upper and a lower part. The engine will also have an injection nozzle which is mounted in the cylinder such that the nozzle tip will be at least near the axis of the chamber, its fuel jets will be directed towards the wall of the combustion chamber in the piston, and the geometrical points of intersection of the axes of its nozzle holes will lie below the narrowest cross-section of the constriction in the combustion chamber in the piston throughout the entire injection period.

DESCRIPTION OF THE PRIOR ART

Swiss Pat. No. 211.350 discloses an internal combustion engine of the general kind to which the present invention is directed in which the upper part of the combustion chamber is formed by a part of a cone-shaped shell having a very large apex angle. This flat construction is supposed to reduce the radial velocity of the air entering the chamber as the piston is rising in order not to upset the rotation of the airflow induced by a masked inlet valve. The flat divergence of the upper part of the combustion chamber towards the periphery of the piston causes an almost constant delay in the entering air, with the disadvantage of low turbulence. This results in a rapid partially "freezing in", i.e., a premature interruption of the combustion as the burning fuel-air mixture spills over from the lower to the upper part of the chamber during the downward movement of the piston. Tests have shown that the exhaust gases of this known engine contain relatively high quantities of soot and a high proportion of unburnt hydrocarbons.

These disadvantageous made products, the avoidance of which is of increasing significance because of efforts to achieve purer exhaust gases, increase in occurrence if, in order to obtain lower emission values and a better efficiency, the engine is operated at a high compression ratio, as well as in engines supposed to run at high speeds with a relatively late start to the injection process.

The aforementioned engine, originating from before 1940 and accordingly running at relatively low speeds, has a combustion chamber with a constriction, the sectional area of which is about 36 percent of the sectional area at the maximum diameter of the chamber. This marked constriction and the resulting loss of power as a consequence of throttling or transfer losses is a substantial drawback, especially in modern high speed engines, as the throttling losses increase as the square of the rotational speed of the engine.

It is an object of the present invention to avoid the aforementioned drawbacks in engines of the kind referred to and to provide an adequate solution to the mixture formation in the combustion chamber even in engines having small cylinder dimensions and which run at high speeds.

SUMMARY OF THE INVENTION

According to the present invention this problem is solved in engines of the kind described in the introduction, by including a number of canals in the connecting passage formed by the constriction between the upper part and the lower part of the combustion chamber and in the region of the circumference of the chamber, the connecting canals being constructed to be groovelike and open to the chamber.

Using this configuration for the combustion chamber, an unexpectedly marked reduction in both the fuel consumption and in the emission of unburnt hydrocarbons and soot is obtained. This is obviously traceable back to a micro turbulence in the contents of the combustion chamber in the piston produced by the connecting canals.

It is possible to produce turbulence in a flowing medium by bringing together mediums with different components of speed. The arrangement of connecting canals in the region of the narrowest cross-section of the constriction produces an increased area of contact between the air flow entering the chamber during the compression stroke of the engine and the air already present in the chamber. Thereby, increased micro turbulence of the contents of the chamber is produced. The advantages of this arrangement are based on this micro turbulence, which is easy to achieve and which results in a rapidly occurring, exceptionally effective mixture formation and a significantly more favorable combustion process.

Further, because of the use of groovelike canals which are open to the chamber, an advantageous flow interference and, simultaneously, an easy manufacturing of the chamber in the piston is enabled. Especially if the ingoing air is rotating about the cylinder axis, the edges of the grooves in the constriction act as sharp edges for the rotating flow which results in micro turbulence and a further increased quality of the mixture formation and the combustion process.

The intensity of the turbulence depends on the velocity of the air going into the chamber and, therefore, depends on the area of the narrowest cross-section between the upper part and the lower part of the chamber, too. A large cross-sectional area results in a slow going-in velocity and, therefore, in a low turbulence; whereas a small cross-sectional area results in a high going-in velocity and, therefore, in a high turbulence, but also in high current losses and a decrease of the efficiency of the engine.

According to another embodiment of the present invention the surface area of the narrowest cross-section of the constriction, including the sectional area of the connecting canals, amounts to about 50 to 80 percent of the maximum cross-section of the chamber, and the upper part of the chamber, including the part of the connecting canals lying above the narrowest cross-section of the constriction, has a volume of about 10 to 30 percent of the total volume of the chamber.

Due to the high speed of the air entering the upper part of the chamber, with the marked increase of this speed in the connecting canals and the sudden enlargement below the narrowest cross-section, a layer of high turbulence is formed above the narrowest cross-section which supports a fast and complete afterburning of the mixture flowing out of the chamber after the ignition, and prevents the premature "freezing in" of the combustion due to forced chill at the narrow slit above the piston crown. These advantages of the invention are in particular favorable in a relatively late starting injection process—as it is practiced to reduce the content of nitric oxydes in the exhaust gas—and in engines operated at high speeds. Above all, the combustion is remarkable because of the relatively low content of soot in the exhaust. The high turbulence is achieved without the necessity of a marked constriction of the chamber. Compared to the known engine, this results in a reduced fuel consumption, too.

According to a further embodiment of the invention, it be also possible that the compression ratio of the engine is higher than 19:1. Moreover, a high compression ratio results in a desirable reduction in the emission of un-burnt hydrocarbons. In direct ignition internal combustion engines the content of soot in the exhaust increases with increasing compression ratios, because the utilization of the air by the fuel decreases for a certain soot limit with increasing compression ratio. With a combustion chamber constructed according to the present invention, it is possible, however, to raise the utilization of the combustion air even at a high compression ratio, so that not only low amounts of unburnt hydrocarbons and soot in the exhaust are obtained, but also the loss of power is advantageously compensated for.

The mixture formation is further improved and shortened if the connecting canals extend from the crown of the piston to the region of the maximum diameter of the chamber. Therefore, e.g., it is favorably possible to transfer the region of high turbulence to the region of the points of impact of the fuel jets.

A further refined micro turbulence is obtained if, according to another feature of the invention, two of the connecting canals at a time are arranged with their axes converging towards the bottom of the chamber, because thereby two partial streams of the air entering the lower part of the chamber at a time impinge against one another.

A further improvement of the invention is obtained if the axes of the connecting canals are parallel in the development of the chamber and form acute angles with planes including the axis of the chamber. This improvement is especially advantageous with an inlet port not designed for inducing rotation of the incoming air about the axis of the cylinder because such rotation is induced now by the special arrangement of the connecting canals. Simultaneously, an increased micro turbulence is achieved without further steps.

With an inlet port constructed to induce rotation of the incoming air, it is favorable, according to another embodiment of the present invention, if the axes of the connecting canals form obtuse angles with the direction of rotation of the incoming air. In that way, opposed streams of air are generated which are torn into tiny particles as they clash together. Thereby, the mixing with the injected fuel is further improved.

A high turbulence of the partial air streams is obtainable if, according to another feature of this invention, at least one part of the bottom of the combustion chamber is constructed as a cone, the apex of which extends towards the crown of the piston and lies substantially in the axis of the chamber. Thereby, a local specified deflection of the partial air streams entering the lower part of the chamber results, and marked tubulences are formed into which the fuel is injected.

DESCRIPTION OF THE DRAWINGS

Some embodiments of this invention will now be described with reference to the accompanying drawings in which.

DESCRIPTION OF THE PREFERRED EMBODIMENTS

Figure 1:
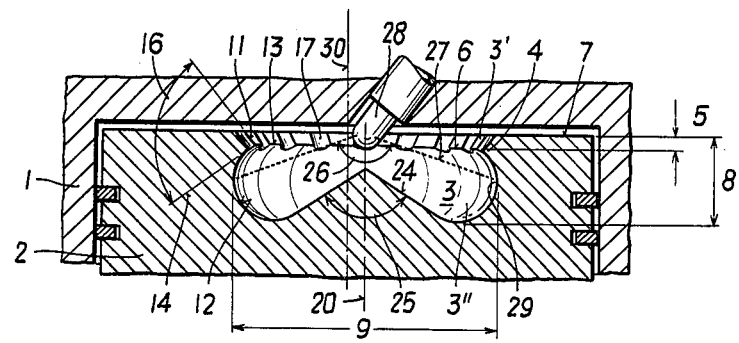
FIG. 1 shows a vertical sectional view of a piston and cylinder in a combustion engine constructed according to this invention, with the piston at top dead center.

As indicated in FIG. 1, a piston 2, which moves axially in a cylinder 1 of the inventive engine, includes a combustion chamber 3 which is divided into an upper part 3' and a lower part 3" by a constriction 4. Both parts of the chamber are constructed as bodies of rotation—the lower part is formed by a torus and the upper part by a truncated cone—with coninciding axes. However, other bodies of rotation are also possible; for example, both the lower and the upper part of the chamber could be ellipsoidal or toroidal bodies of rotation, or the transition of the lower part to the constriction could be constructed likewise as a cone. The side walls of the lower part of the chamber could also be constructed cylindrically. The upper part 3' of the chamber 3 has a volume of about 10 to 30 percent of the total volume of the chamber and the distance 5 of the narrowest cross-section 6 to the crown 7 of the piston likewise is about 10 to 30 percent of the maximum depth 8 of the chamber. The narrowest cross-section 6 has a diameter of about 75 to 80 percent of the maximum diameter 9 of the chamber 3. The maximum diameter 9 of the chamber can lie in the range of 45 to 65 percent of the piston diameter and the depth 8 of the chamber can run to 10 to 25 percent of the piston stroke of the engine.

In FIG. 1 the constriction 4 is formed by the intersection of a cone 11 with the surface 12 of the lower toroidal part 3" of the chamber. At the intersection of the upper body of rotation with the lower one, an annular connecting passage 13 is defined, which, in the embodiment of FIG. 1, also provides the narrowest cross-section of the constriction. The edges of the constriction 4 in the region of the connecting passage 13 and in the region of the circle of intersection of the cone 11 with the crown 7 of the piston can be rounded off.

Figure 3:
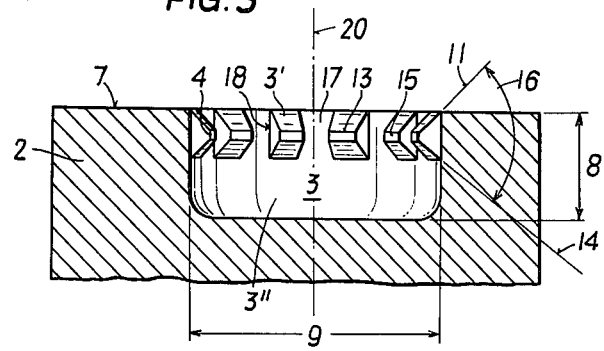
FIG. 3 shows a vertical sectional view through a piston constructed according to another embodiment of the present invention
Figure 4:
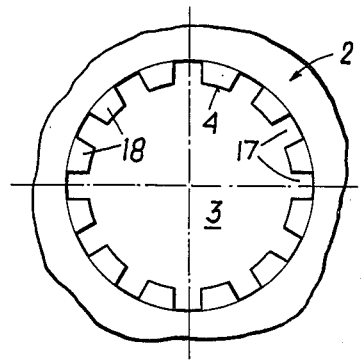
FIGS. 4 and 5 show top views of specific embodiments of the chamber in the piston of FIG. 3.
Figure 5:
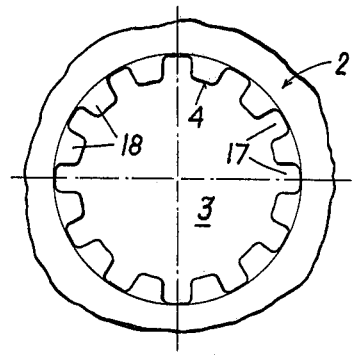

The variant illustrated in FIG. 3 shows a cone 14 at the transition of the lower part 3" to the constriction, too, and is provided with a small cylindrical surface 15 in the region of the connecting passage 13. In this case, the minimum cross-section of the constriction is not identical with the circle of intersection of the two bodies of rotation.

There are also other forms possible for the shape of the constriction. For example, the upper body of rotation can be part of a torus, whereby by appropriate selection of the torus portion used, a concave or a convex flank of the constriction results. The flank angle 16 can be between 70 and 120 degrees.

Besides the connecting passage 13 between the upper part 3′ and the lower part 3″ of the chamber 3, a number of connecting canals 17 are provided in the region of the circumference of the chamber 3. According to FIG. 1, these canals extend from the crown 7 of the piston to slightly below the narrowest cross-section of the constriction 4. The connecting canals 17 are constructed as grooves open to the chamber 3 and are distributed regularly at the circumference of the constriction; but any other kind of distribution is possible, too. The cross-section of the connecting canals can be of many different shapes; FIGS. 1 to 7 show only some of the possible forms. The canals 17 can have parallel side walls and a rounded off bottom (FIGS. 1,2) or the straps 18 remaining between the canals can have a triangular, trapezoidal (FIG. 4) or partly circular cross-section. The edges of the straps are rounded off (FIG. 5) or chamfered to increase the thermal capacitance of the piston. Triangular or trapezoidal cross-sections of the straps are especially advantageous for the necessary removal of heat, because thereby the cross-section for the heat flow increases steadily. To avoid thermal cracks, the connecting canals are rounded off at their bottom.

The depth of the connecting canals and the width-ratio of the straps and the canals are variable within broad limits. Because of the thermal capacitance, however, a substantially small width of the straps, compared to the width of the canals, is less favorable.

Figure 6:
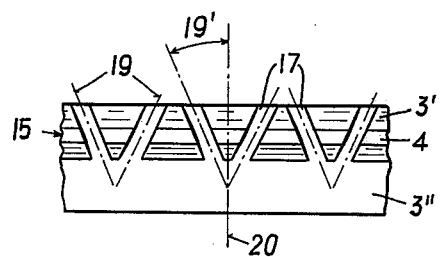
FIGS. 6 and 7 show further embodiments of the connecting canals in developed (planar) representations.

As indicated in FIG. 6, the axes 19 of two adjoining canals 17 can be arranged so as to converge towards the bottom of the chamber. In this way, two partial air streams are lead together to impinge against one another, producing a marked turbulence.

Figure 7:
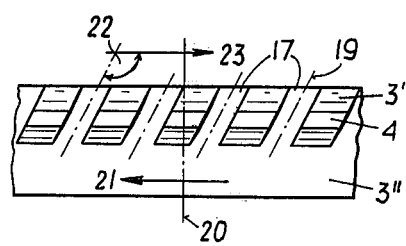

FIG. 7 indicates, using a developed (planar) projection, another arrangement of the canals, wherein they are inclined to the axis 20 of the combustion chamber but parallel to each other. Thus, rotation of the air entering the lower part 3″ of the chamber 3 is induced in the direction of arrow 21. In this way it is possible, without any special arrangement of the inlet port, to obtain a rotation of the combustion air about the axis 20 of the combustion chamber 3. If, on the contrary, the inlet port is constructed to induce rotation of the incoming air, it is possible, by arranging the canals 17 to form obtuse angles with the direction of rotation 23 of the incoming air, to produce a counterflow, which results in increased turbulence.

Figure 2:
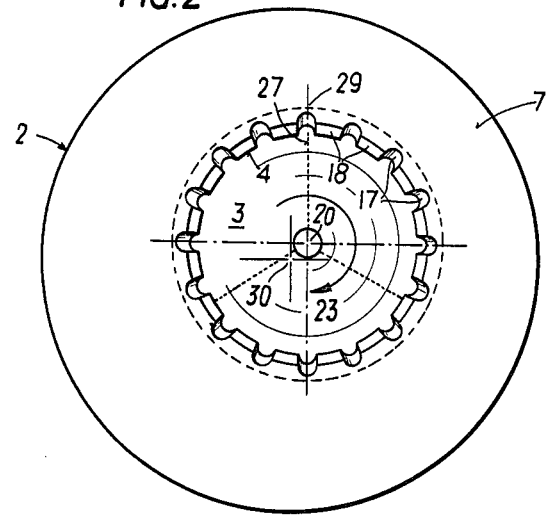
FIG. 2 depicts a top view of the piston shown in FIG. 1.

The bottom of the chamber 3 in FIG. 1 is provided with a cone 24, the apex of which extends towards the crown 7 of the piston and lies substantially on the axis 20 of the chamber 3. The angle of the cone 24 is practically less or equal to the angle 26 of the cone including the axes 27 of the fuel bores of the injection nozzle, and the height of the cone 24 can amount to about 75 percent of the depth of the chamber 3. The injection nozzle 28 is arranged with its tip on the axis 26 of the chamber 3 and includes at least three fuel bores, which are arranged with their axis on a cone but which are not conclusively distributed regularly on the circumference of the nozzle. The fuel jets emerging from the nozzle 28, indicated by the axes 27 of the fuel bores, are arranged so that their geometrical points of intersection with the wall of the chamber 3 lie beneath the narrowest cross-section 6 of the constriction 4 throughout the whole injection period. FIG. 2 shows the chamber 3, which is arranged with the axis out of the cylinder axis 30 for constructional reasons, and the distribution of the axes of the fuel jets and the points of intersection 29.

The termination of the mixture formation by means of the combustion chamber arrangement according to the present invention can be described as follows:

The incoming air is rotated in the direction of arrow 23 (in FIG. 2) by a specially designed inlet port. This rotation lasts during the compression stroke. With the approach of the piston to the top dead center, the air rotating in the cylinder is pressed via the construction 4 into the chamber 3 whereby a marked increase of the vertical velocity of the air is obtained. A portion of the air enters the lower part 3″ of the chamber 3, during which an additional increase of its velocity is obtained in the narrow connecting canals. At this condition of high turbulence the fuel is injected in at least three jets against the wall of the chamber 3 beneath the narrowest cross-section 6, whereby the fuel is subtly and homogeneously distributed. The inventive arrangement of the constriction 4, the connecting canals 17 and the bottom of the chamber supports the mixture formation, whereby, after just a short ignition delay, a favorable combustion process with regard to efficiency, fuel consumption and quality of exhaust gas results. Since the injection in small engines needing a low content of harmful substances in the exhaust as, e.g., in car engines, starts with just a few degrees of turn of the crankcase before the top dead center, the injection nozzle 28 dips very deeply in the chamber 3. So, almost all the fuel is injected directly into the lower part 3″ of the chamber 3. After the ignition, the burning mixture advances to the upper part 3′ of the chamber 3 and mixes with a highly turbulent layer of relatively pure combustion air, whereby a quick and complete combustion of the charge is obtained.

I claim:

1. A compression ignition, direct injection internal combustion engine, particularly comprising at least one cylinder, a piston and an injection nozzle, a combustion chamber or cavity in the form of a body of rotation disposed in the piston and receiving almost the entire quantity of combustion air at the end of the compression stroke, wherein said chamber having, below the crown of the piston, a constriction dividing the chamber into an upper and a lower part, said injection nozzle being mounted with the nozzle tip at least near the axis of the chamber and with the fuel jets being directed towards the wall of the chamber, the geometrical points of intersection of the axes of the nozzle holes lying below the narrowest cross-section of the constriction in the chamber throughout the entire injection period, a connecting passage formed by the constriction between the upper part and the lower part of the combustion chamber including a number of connecting canals in the region of the circumference of the chamber, and said connecting canals being constructed to be groove-like and open to the chamber.

2. An engine according to claim 1, wherein the surface area of the narrowest cross-section of the constriction, including the sectional area of the connecting canals, amounts to about 50 to 80 percent of the maximum cross-section of the chamber, and the upper part of the chamber, including the part of the connecting canals lying above the narrowest cross-section of the constriction, has a volume of about 10 to 30 percent of the total volume of the chamber.

3. An engine according to claim 1, wherein the compression ratio of the engine is higher than 19:1.

4. An engine according to claim 1, wherein said connecting canals extend from the crown of the piston to the region of the maximum diameter of the chamber.

5. An engine according to claim 1, wherein two of said connecting canals at a time are arranged with their axes converging towards the bottom of the chamber.

6. An engine according to claim 1, wherein the axes of said connecting canals are parallel in the development of the chamber and acute angles with planes including the axis of the chamber.

7. An engine according to claim 6, comprising an inlet port for inducing rotation of the incoming air about the axis of the cylinder, and wherein the axis of said connecting canals form obtuse angles with the direction of rotation of the incoming air.

8. An engine according to claim 1, wherein at least a part of the bottom of said combustion chamber is constructed as a cone with the apex extending towards the crown of the piston to lie substantially on the axis of the chamber.

* * * * *